United States Patent [19]

Ichikawa

[11] Patent Number: 5,717,839
[45] Date of Patent: Feb. 10, 1998

[54] IMAGE PROCESSOR AND PRINTER HAVING CORRECTION TABLE DATA FOR AN EXTERNAL SOURCE TRANSFERRED TO THE PRINTER

[75] Inventor: Koji Ichikawa, Tokyo, Japan

[73] Assignee: Fuji Photo Film Co., Ltd., Kanagawa, Japan

[21] Appl. No.: 604,902

[22] Filed: Feb. 22, 1996

[30] Foreign Application Priority Data

Feb. 22, 1995 [JP] Japan .................................... 7-033659
Dec. 20, 1995 [JP] Japan .................................... 7-331674

[51] Int. Cl.$^6$ .............................. H04N 1/56; H04N 1/60
[52] U.S. Cl. ..................... 395/109; 358/518; 358/523
[58] Field of Search ............................ 358/523, 521, 358/520, 518, 504; 395/109

[56] References Cited

U.S. PATENT DOCUMENTS 5,335,097   8/1994   Murakami .............................. 358/520

*Primary Examiner*—Scott A. Rogers

[57] ABSTRACT

An image processor enables an input image to be printed out favorably at all times irrespective of the combination of an image input device and a printer. The image processor has optimum correction table data corresponding to each of combinations of various types of image input device and printers. The correction table data includes gradation correction table data, brightness correction table data, hue correction table data, and saturation correction table data. The image processor identifies the type of image input device on the basis of captured image information, also identifies the type of printer by communication with a printer, and transfers correction table data corresponding to the image input device/printer combination to the printer. Thus, a hard copy having favorable brightness, gradation, hue and saturation is output from the printer.

16 Claims, 4 Drawing Sheets

FIG. 5

Type of electronic camera is A.
Type of printer is a.
Set mode and correction quantity.

31 — [AUTO] [MANUAL] — 32

| Brightness correction quantity | -2 | -1 | 0 | 1 | 2 |
| Gradation correction quantity | -2 | -1 | 0 | 1 | 2 |
| Hue correction quantity | -2 | -1 | 0 | 1 | 2 |
| Saturation correction quantity | -2 | -1 | 0 | 1 | 2 |

[SET] — 33

FIG. 6

Select type

| Video camera | Video A | Video B | Video C |
| | Video D | Video E | Video F |
| Scanner | Scanner A | Scanner B | Scanner C |
| Software | Software A | Software B | Software C |
| | Software D | Software E | Software F |

[SET] — 33

IMAGE PROCESSOR AND PRINTER HAVING CORRECTION TABLE DATA FOR AN EXTERNAL SOURCE TRANSFERRED TO THE PRINTER

BACKGROUND OF THE INVENTION

The present invention relates to a printer for printing image data, and also relates to an image processor which is disposed between a printer and an image input device. Further, the present invention relates to a printer system having such a printer and an image processor.

It is conventional practice to print an image taken with an electronic still camera (hereinafter referred to simply as "electronic camera") or a combination TV camera/VTR system, known as "video camera", by using a printer. An example of an arrangement for that purpose is shown in FIG. 9.

In FIG. 9, reference numeral 1 denotes an electronic camera as an image input device, a printer 2 performs color printing, a personal computer 3 (hereinafter referred to as "PC"), a PC 4 body including a processing unit, a monitor, 5 an input device 6 including a keyboard and a mouse. It should be noted that, although an example in which an electronic camera is used as an image input device is explained herein, the same is true in a case where another image input device, e.g. a video camera or a color scanner (hereinafter referred to simply as "scanner"), is used, as a matter of course.

Image data that is output from the electronic camera 1 is input to the PC 3 through a communication line 7. The user can display an image on the monitor 5 by operating the input device 6 of the PC 3.

When instructed to perform printing through the input device 6, the PC 3 transfers image data concerning the image which is being displayed on the monitor 5 to the printer 2 through a communication line 7. In response to this, the printer 2 captures the transferred image data and carries out a predetermined printing process. Thus, a color print of the desired image is obtained.

In the conventional printer, however, the printer 2 is designed to carry out a printing process according to the concept of WYSIWYG. That is, the printer 2 prints an image as it is displayed on the monitor 5. Accordingly, no satisfactory color print can be obtained with the conventional printer.

One reason for this is that the overall gamma ($\gamma$) value of the entire system, from a subject of an image to be printed by the printer 2 to a hard copy, is approximately 1. That is, an image which is to be displayed on the monitor 5 is required to have $\gamma=1$ when actually displayed. Therefore, in the electronic camera 1, image data is subjected to gamma correction with $\gamma=0.45$, and the corrected image data is displayed on the monitor 5 with $\gamma=2.2$, thereby enabling an image of $\gamma=1$ to be eventually displayed. However, according to the concept of WYSIWYG, an image is printed as it is displayed on the monitor 5. Consequently, an image that is printed by the printer 2 also has $\gamma=1$, as a matter of course.

However, considering the dynamic range of brightness, the dynamic range of printing paper is overwhelmingly wider than that of the monitor 5. Therefore, if the gamma of the printed image is set at 1, not only does the image quality becomes soft, but also the brightness becomes insufficient. Particularly, flesh color becomes dark. This has been confirmed by the present inventor.

In actuality, it has been confirmed by an experiment conducted by the present inventor that, if the relationship between the subject reflectivity and the image gradation shows a characteristic such as that indicated by B in FIG. 10, a print having an excellent gradation can be obtained. That is, the following fact has been confirmed. In FIG. 10, A shows a characteristic for printing image data subjected to gamma correction with $\gamma=0.45$ in an electronic camera according to WYSIWYG. With such a characteristic, the image quality becomes soft, and the brightness is insufficient. However, by correcting a region where the subject reflectivity is low, that is, a dark portion of the image, so that the dark portion becomes bright, as shown by the characteristic B, it is possible to obtain a beautiful print having an excellent gradation. It should be noted that in FIG. 10 the image gradation has 256 scale divisions.

It will be understood from the foregoing that printing according to WYSIWYG also has the problem that the printer cannot display its full capability.

That is, the dynamic range of printing paper is overwhelmingly wider than that of the monitor 5, as described above. In terms of the printable density range, the dynamic range of printing paper roughly ranges from 0.1 to 2.3. In contrast, the dynamic range of the monitor is so narrow that it roughly ranges from 0.1 to 1.5 or so, as the brightness range is converted to print density.

Thus, although the printer is capable of expression over a density range of, roughly, from 0.1 to 2.3, the density range is restricted within a narrow range of from about 0.1 to about 1.5 in order to realize WYSIWYG. Therefore the printer is not utilized to its full capability.

Conventional printers usually have density adjusting function, as a matter of course. Conventionally, however, the overall gradation characteristics of the entire system, from a subject to a hard copy, are usually determined by only the gamma characteristics of the electronic camera and the gradation characteristics of the printer. Moreover, the density adjusting function of the printer itself is set entirely independently of the overall gradation characteristics, that is, without taking the overall gradation characteristics into consideration. Therefore, even if density adjustment is made by using the density adjusting function of the printer, it is impossible to obtain a print having an excellent gradation.

SUMMARY OF THE INVENTION

The present invention was made to solve the above-described problems, and an object of the present invention is to provide an image processor which enables a printer to display its capability to the full with respect to image data from any type of image input device, thereby making it possible to obtain a print having an excellent gradation.

Another object of the present invention is to provide a printer which is capable of displaying its capability to the full with respect to image data from any type of image input device and also capable of obtaining a print having an excellent gradation.

Still another object of the present invention is to provide a printer system which enables a printer to display its capability to the full with respect to image data from any type of image input device, thereby making it possible to obtain a print having an excellent gradation.

To attain the above-described objects, the present invention provides an image processor for printing images of constant quality whatever type of image input device and whatever type of printer are combined with each other. The image processor includes: a storage device for storing a plurality of items of at least one of correction table data necessary when an image is to be printed, such as gradation correction table data, saturation correction table data, hue correction table data, and brightness correction table data, for each combination of a type of image input device and a type of printer; an image memory for storing image data read out from an image file recorded on a recording medium such as a memory card by an image input device such that compressed image data is stored after being expanded, whereas non-compressed image data is stored as it is; and a control device for automatically or manually reading out correction table data from the storage device on the basis of information concerning an image input device written in an input image file and attached information such as information concerning the type of printer, and for transferring the correction table data to a printer, the control device further reading out image data from the memory and transferring it to the printer.

The image processor operates and produces advantageous effects as follows:

The image processor has a storage device, an image memory, and a control device. The storage device is stored with a plurality of items of at least one of correction table data necessary when an image is to be printed, such as gradation correction table data, saturation correction table data, hue correction table data, and brightness correction table data, for each combination of a type of image input device and a type of printer.

For a combination of a printer of the type A and an electronic camera of the type α, for example, the storage device is stored with a plurality of gradation correction table data items, a plurality of saturation correction table data items, a plurality of hue correction table data items, and a plurality of brightness correction table data items. It is the same with a combination of a printer of the type A and an electronic camera of the type β.

The storage device is also stored with a plurality of items of at least one of gradation, saturation, hue and brightness correction table data for each of combinations of a printer of the type A and various scanners, or for each of combinations of a printer of the type A and various video cameras.

The reason why a plurality of items of one correction table data, e.g. gradation correction table data, are prepared for a combination of an electronic camera of the type A and a printer of the type a, for example, is to allow the user to select a desired gradation correction by a manual operation. Similarly, not one but a plurality of correction table data items are prepared for each of hue, saturation and brightness correction table data corresponding to the combination of an electronic camera of the type A and a printer of the type a so that the user can select a desired hue, saturation and brightness by a manual operation.

These correction table data items are previously set at optimum quantities by experiments or the like so as to satisfy the respective desired overall gradation characteristics, as a matter of course. It is the same with each of combinations of various image input devices and various printers.

It should be noted that each of correction table data, i.e. gradation correction table data, saturation correction table data, hue correction table data, and brightness correction table data, may be in the form of a lookup table or merely a single correction coefficient.

The image memory is stored with image data read out from an image file recorded on a recording medium, e.g. a memory card, in an image input device. In a case where the image data is compressed, it is stored after being expanded; in a case where it is not compressed, the image data is stored as it is.

The control device transfers correction table data and image data to a printer. Correction table data to be transferred can be automatically selected, and it is also possible for the user to select desired correction table data by a manual operation.

For example, for a combination of a printer of the type a and an electronic camera of the type A, a plurality of gradation correction table data items have been prepared. In this case, if automatic selection is set, the control device reads out from the storage device gradation correction table data for automatic selection from among a plurality of gradation correction table data items corresponding to the printer/electronic camera combination, and transfers it to the printer. If manual selection is set, the control device reads out from the storage device correction table data that is selected by the user from among a plurality of gradation correction table data items corresponding to the printer/ electronic camera combination, and transfers it to the printer.

Further, the control device reads out image data from the image memory and transfers it to the printer.

Thus, the image processor enables optimum correction table data to be set in the printer automatically or by a manual operation. Therefore, desired overall gradation characteristics can be realized, and thus it is possible to obtain a print having a favorable image as a color print whatever image input device and printer are combined with each other.

In addition, the present invention provides a printer for effecting printing on the basis of transferred image data. The printer includes: a storage device for storing at least one of correction table data necessary when an image is to be printed, such as gradation correction table data, saturation correction table data, hue correction table data, and brightness correction table data; an image memory for storing transferred image data; and a control device for writing transferred correction table data into the storage device and for correcting the image data stored in the image memory by the correction table data stored in the storage device, thereby printing the corrected image data.

The printer operates and produces advantageous effects as follows:

In the printer, transferred correction table data is written into the storage device by the control device. Printing processing is executed by using the transferred correction table data.

Each of correction table data, i.e. gradation correction table data, saturation correction table data, hue correction table data, and brightness correction table data, may be in the form of a lookup table or merely a single correction coefficient.

Thus, according to the printer, optimum correction table data are transferred when input image data is to be printed, and printing processing is executed by using the correction table data. Therefore, desired overall gradation characteristics can be realized, and thus it is possible to obtain a print having a favorable image as a color print whatever image input device is combined with the printer.

In addition, the present invention provides a printer system having an image input device, an image processor, and a printer for effecting printing on the basis of transferred image data and correction table data. The image processor is designed to print images of constant quality whatever type of image input device and whatever type of printer are combined with each other. The image processor includes: a storage device for storing a plurality of items of at least one of correction table data necessary when an image is to be printed, such as gradation correction table data, saturation correction table data, hue correction table data, and brightness correction table data, for each combination of a type of image input device and a type of printer; an image memory for storing image data read out from an image file recorded on a recording medium such as a memory card by an image input device such that compressed image data is stored after being expanded, whereas non-compressed image data is stored as it is; and a control device for automatically or manually reading out correction table data from the storage device on the basis of information concerning an image input device written in an input image file and attached information such as information concerning the type of printer, and for transferring the correction table data to a printer, the control device further reading out image data from the memory and transferring it to the printer. The printer is arranged to effect printing on the basis of transferred image data. The printer includes: a storage device for storing at least one of correction table data necessary when an image is to be printed, such as gradation correction table data, saturation correction table data, hue correction table data, and brightness correction table data; an image memory for storing transferred image data; and a control device for writing transferred correction table data into the storage device and for correcting the image data stored in the image memory by the correction table data stored in the storage device, thereby printing the corrected image data.

The printer system operates and produces advantageous effects as follows:

The printer system has an image input device, the above-described image processor, and the above-described printer. The image processor and the printer operate as described above.

Thus, according to the printer system, correction table data which are the most suitable for printing image data input from the image processor are transferred to the printer, and correction processing is executed in the printer by using the correction table data. Therefore, desired overall gradation characteristics can be realized, and thus it is possible to obtain a print having a favorable image as a color print whatever image input device and printer are combined with each other.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5 shows an example of a menu.

FIG. 6 shows an example of a menu.

DESCRIPTION OF THE PREFERRED EMBODIMENTS

Embodiments will be described below with reference to the accompanying drawings.

Figure 1:
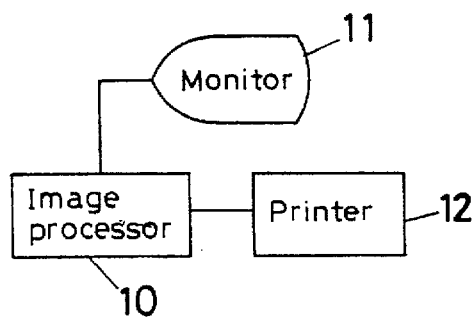
FIG. 1 shows the arrangement of an embodiment of the present invention.

FIG. 1 shows the arrangement of one embodiment of the printer system according to the present invention. In the figure, reference numeral 10 denotes an image processor, 11 a monitor, and 12 a printer.

Figure 2:
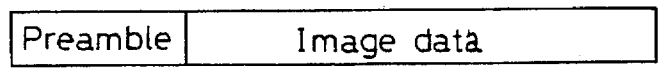
FIG. 2 shows an example of the structure of image information.

It is assumed that an electronic camera (not shown in FIG. 1) in this embodiment is adapted to write red (R), green (G) and blue (B) image data, which are obtained by imaging, onto a memory card in compressed form by a predetermined data compression method, e.g. the JPEG method, and that, as shown in FIG. 2, a preamble is put to the top of the image data to be written, and the name of the type of electronic camera is written in a predetermined portion of the preamble. The image processor 10, shown in FIG. 1, reads image information including the preamble and the image data from the memory card. In this embodiment, the image processor 10 serves as an image input device. It should be noted that the electronic camera is assumed to be adapted to make gamma correction with $\gamma=0.45$ so that the image data becomes suitable for display on the monitor, in the same way as in the conventional technique.

It is a matter of course that a video camera or a scanner may also be used as an image input device, which will be explained later.

Although in the following embodiment gradation correction table data, saturation correction table data, hue correction table data, and brightness correction table data each have a lookup table (hereinafter referred to as "LUT") form, these data items may be merely correction coefficients.

Figure 3:
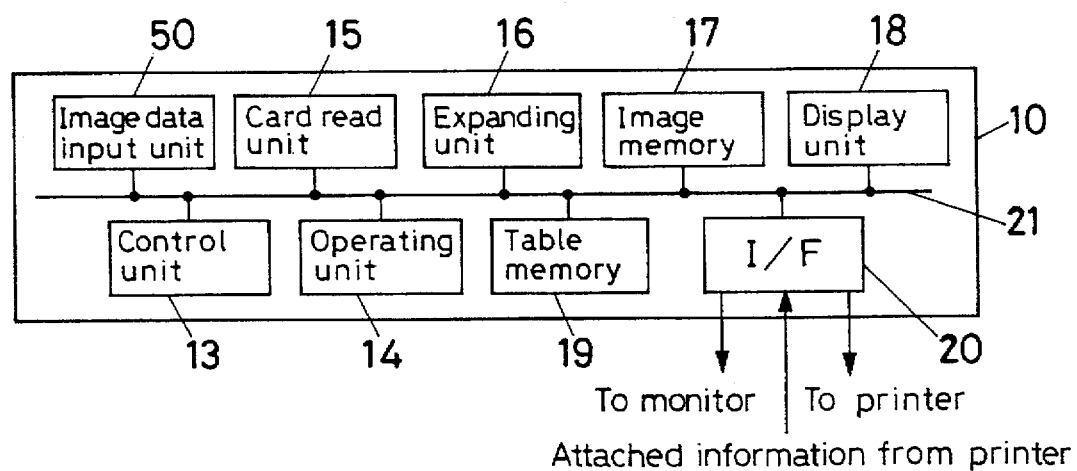
FIG. 3 shows an example of the arrangement of an image processor.
Figure 4:
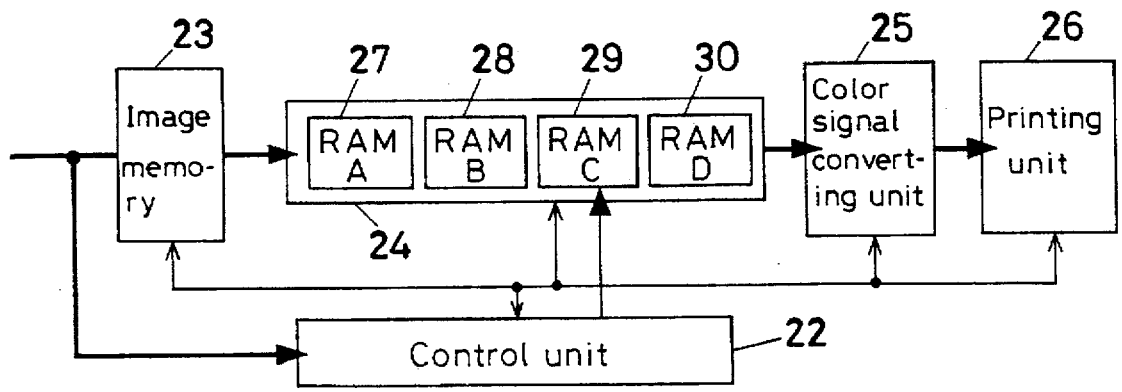
FIG. 4 shows an example of the arrangement of a printer.

The image processor 10, shown in FIG. 1, has an arrangement as shown, for example, in FIG. 3, and the printer 12 has an arrangement as shown in FIG. 4. In FIG. 3, the image processor 10 includes a control unit 13, an operating unit 14, a card read unit 15, an expanding unit 16, an image memory 17, a display unit 18 a table memory 19, an interface 20 (hereinafter referred to as "I/F"), a system bus 21, and an image data input unit 50. In FIG. 4, the printer 12 includes 22 a control unit 22 an image memory, 23 a correcting unit 24, a color signal converting unit 25, and a printing unit. Further, reference numerals 27, 28, 29 and 30 denote RAMs. In FIG. 4, the thick solid lines show the flow of data, and the thin solid lines show the flow of control signals.

In FIG. 3, the control unit 13 generally controls operations of the entire image processor 10. The operating unit 14 has ten-key, cursor and other buttons or a mouse, and is used to select an image to be printed and to set various correction conditions (described later).

The card read unit 15 reads image information from a memory card, and the expanding unit 16 expands the compressed image data read from the memory card to restore it to the previous image data.

The image memory 17 is provided for temporarily storing the image data read from the memory card and expanded in the expanding unit 16.

The display unit 18 includes an appropriate display device, e.g. a liquid crystal display device. The display unit 18 displays various menus for selection of an image to be printed and for setting various printing conditions.

The image data input unit 50 is used to capture image data from a video camera, a scanner, or a PC.

It should be noted that, as shown in FIG. 1, a monitor 11 can be connected to the image processor 10. When it is connected to the image processor 10, the monitor 11 displays the same menu as displayed on the display unit 18. In other words, the display unit 18 is provided so that it is possible to select an image to be printed and to set various printing conditions even when the monitor 11 is not connected to the image processor 10. In this embodiment, it is assumed that the image processor 10 has the monitor 11 connected thereto, as shown in FIG. 1.

The I/F 20 is used to transfer image data which has been written in the image memory 17 to the monitor 11 and to transfer correction table data read out from the table memory 19 and image data read out from the image memory 17 to the printer 12. The control unit 13 communicates with the printer (not shown in FIG. 3) through the I/F 20 to capture attached information such as information about the type of printer.

The table memory 19 has various correction table data stored therein. More specifically, the table memory 19 has been stored with four different kinds of correction table data, i.e. gradation correction table data, hue correction table data, saturation correction table data, and brightness correction table data, corresponding to each of combinations of various printers and various electronic cameras.

These correction table data have not one but five data items set for each of them. One of them is standard correction table data which is used when an image taken under a correct exposure is to be printed. With the standard correction table data item placed at the center, there are two correction table data items which are used when an underexposed image is to be printed, and two correction table data items which are used when an overexposed image is to be printed. Thus, a total of five correction table data items constitute each of the four different kinds of correction table data. In other words, when an underexposed image or an overexposed image is to be printed, it is possible to make correction at two stages.

It is a matter of course that it is possible to set a larger number of correction table data items. However, when an image is to be taken with an electronic camera, attention is usually paid to exposure adjustment, and as the number of correction table data items increases, selection of data becomes troublesome. Therefore, about five correction table data items will suffice. Moreover, if the number of correction table data items is five or so, the correction of brightness, gradation, hue or saturation can be made with a feeling similar to the feeling that the user has when adjusting the diaphragm of an electronic camera.

In this sense, it is desirable to set the two correction table data items in each correction table which are used when an underexposed image is to be printed as follows: One of the two correction table data items is set so that an image underexposed one stop with an electronic camera will be printed equivalently to an image taken under the correct exposure, and the other correction table data item is set so that an image underexposed two stops with an electronic camera will be printed equivalently to an image taken under the correct exposure.

Similarly, it is desirable to set the two correction table data items in each correction table which are used when an overexposed image is to be printed as follows: One of the two correction table data items is set so that an image overexposed one stop with an electronic camera will be printed equivalently to an image taken under the correct exposure, and the other correction table data item is set so that an image overexposed two stops with an electronic camera will be printed equivalently to an image taken under the correct exposure.

Accordingly, five correction table data items are set for each of the four different kinds of correction table data, i.e. gradation correction table data, hue correction table data, saturation correction table data, and brightness correction table data, in correspondence to a combination of a printer of the type A and an electronic camera of the type a, for example.

Similarly, five correction table data items are also set for each of the four different kinds of correction table data, i.e. gradation correction table data, hue correction table data, saturation correction table data, and brightness correction table data, in correspondence to a combination of a printer of the type A and an electronic camera of the type b, and five correction table data items are also set for each of the four different kinds of correction table data, i.e. gradation correction table data, hue correction table data, saturation correction table data, and brightness correction table data, in correspondence to a combination of a printer of the type A and an electronic camera of the type c. The same is true of other combinations: a combination of a printer of the type B and an electronic camera of the type a; a combination of a printer of the type B and an electronic camera of the type b; a combination of a printer of the type B and an electronic camera of the type c; and so fourth.

Thus, the table memory 19 is stored with five correction table data items which are set for each of the four different kinds of correction table data, i.e. gradation correction table data, hue correction table data, saturation correction table data, and brightness correction table data, in correspondence to each of combinations of various image input devices and various printers. It is a matter of course that these correction table data may be set for any desired combination of an image input device and a printer.

Each of these correction table data is set so that image data taken with an electronic camera is processed to an image having a desired gradation, hue, saturation and brightness as a hard copy by a printer combined with the electronic camera concerned, as a matter of course. Such correction table data may be set by taking into consideration overall desired gradation characteristics of the entire system, from a subject to a hard copy, the gamma of the electronic camera, the initially set gradation of the printer 12, etc. and further carrying out various experiments.

It should be noted that the reason for providing a brightness correction table, a gradation correction table, a hue correction table and a saturation correction table for each combination of an electronic camera and a printer, as described above, is as follows: First, regarding electronic cameras, the circuit configuration of electronic cameras varies according to the type of electronic camera. Particularly, it makes a significant effect on the resulting image quality whether the gamma correction circuit is arranged by using an analog circuit or a digital circuit. Further, the gradation characteristics of printers are usually set independently and optionally for each type of printer. Accordingly, it is impossible to obtain a print having an excellent image by carrying out gradation correction or other correction with respect to image data only without taking into consideration the gradation characteristics of the printer. It becomes possible to effect correction in which the overall gradation characteristics of the entire system, from a subject to a hard copy, are considered, only by taking into consideration the combination of a specific image input device and a specific printer as in the present invention. As a result, it is possible to print an image which is excellent in gradation, hue, saturation and brightness whatever electronic camera and printer are combined with each other.

Each part of the arrangement of the image processor 10 has been explained above. Next, each part of the printer 12 will be explained with reference to FIG. 4.

The control unit 22 generally controls operations of the entire printer 12. The image memory 23 is used for temporarily storing image data transferred from the image processor 10.

The correcting unit 24 carries out each of gradation, hue, saturation and brightness corrections, and has RAMs 27, 28, 29 and 30 which function as LUTs. To the RAMs 27 to 30, correction table data which is transferred from the image processor 10 is written under the control of the control unit 22, as described later.

The color signal converting unit 25 converts R, G, and B image data into yellow (Y), magenta (M), and cyan (C) image data. The printing unit 26 carries out color printing on the basis of image data on three colors, i.e. Y, M, and C, or image data on four colors, i.e. Y, M, C, and black (K) by preparing black (K) image data from Y, M, and C.

The RAMs 27, 28, 29, and 30 are used to store correction table data transferred from the image processor 10. That is, the RAMs 27, 28, 29 and 30 are stored with gradation correction table data, hue correction table data, saturation correction table data, and brightness correction table data, respectively.

Next, the operations of the image processor 10 and the printer 12 will be explained.

Let us assume that the user sets a memory card in the card read unit 15 and, while observing an image displayed on the monitor 11, he or she selects an image to be printed by operating the operating unit 14.

At this time, the control unit 13 identifies the type of electronic camera used to take the image concerned by referring to a predetermined portion of the preamble of the image information read out from the memory card, and also instructs the expanding unit 16 to expand the image data. Then, the control unit 13 stores the expanded image data into the image memory 17, reads out image data from the image memory 17, and instructs the I/F 20 to transfer the read image data to the monitor 11. Thus, the image concerned is displayed on the monitor 11.

Further, the control unit 13 communicates with the printer 12 through the I/F 20, and captures attached information containing information about the type of printer from the printer 12. By doing so, the control unit 13 recognizes a combination of a type of electronic camera and a type of printer 12.

Next, the user carries out setting of printing conditions through the operating unit 14, e.g. setting of a number of prints to be made and setting of various corrections including gradation correction. The user conducts these setting operations while observing a menu displayed on the monitor 11 or the display unit 18. An example of the menu is shown in FIG. 5.

FIG. 5 shows an example of a menu displayed for setting each correction. It is displayed in the illustrated example that the type of electronic camera used to take the image concerned is A, and the type of printer is a. It will be clear from the foregoing description that the former display of the type of image input device is made on the basis of the type identified by the control unit 13 from a portion of the preamble of the image information, and that the latter display of the type of printer is based on the attached information about the printer obtained by the communication with the printer 12 through the I/F 20.

Assuming that, in a state where the menu is displayed, the user selects an AUTOMATIC button 31 and then selects a SET button 33, the control unit 13 reads out the standard correction table data, which is used to print an image taken under a correction exposure, from the correction table data corresponding to the combination of the electronic camera A and the printer a in the table memory 19, and transfers the read data to the printer 12 through the I/F 20.

More specifically, what is transferred to the printer 12 at this time is as follow: Regarding the brightness correction table data, a correction table data item in which the brightness correction quantity corresponds to "0" is read out from the five correction table data items of the brightness correction table data corresponding to the combination of the electronic camera A and the printer a, and transferred to the printer 12. The same is true of the gradation correction table data, the hue correction table data, and the saturation correction table data. That is, a correction table data item in which the correction quantity corresponds to "0" is selected from each of the gradation, hue and saturation correction table data related to the combination of the electronic camera A and the printer a and transferred to the printer 12.

It should be noted that selection of each button displayed on the menu may be made by clicking a desired button with a mouse attached to the operating unit 14, for example, or by other appropriate method.

In the foregoing, an operation that takes place when the AUTOMATIC button 31 is selected has been described. When a MANUAL button 32 is selected, the following operation takes place:

It is assumed that, in a state where the menu shown in FIG. 5 is displayed, the user selects the MANUAL button 32. At this time, it is necessary to set a correction quantity for each of brightness, gradation, hue and saturation correction quantities. Assuming that "1" has been selected for the brightness correction quantity, "1" for the gradation correction quantity, "2" for the hue correction quantity, and "2" for the saturation correction quantity, the control unit 13 selects correction table data and transfers it to the printer 12 as follows: Regarding the brightness and gradation correction table data, the control unit 13 selects a correction table data item in which the correction quantity corresponds to "1" from the five correction table data items of each of the brightness and gradation correction table data corresponding to the combination of the electronic camera A and the printer a, and transfers the selected data to the printer 12. Regarding the hue and saturation correction table data, the control unit 13 selects a correction table data item in which the correction quantity corresponds to "2" from the five correction table data items from each of the hue and saturation correction table data corresponding to the combination of the electronic camera A and the printer a, and transfers the selected data to the printer 12.

It should be noted that the system may be arranged such that, when no correction quantity is set despite the fact that the MANUAL button 32 has been selected, that is, when the SET button 33 is selected without a brightness correction quantity being set in a case where the MANUAL button 32 has been selected, for example, correction table data in which the correction quantity corresponds to "0" is automatically transferred to the printer 12.

When a printing start instruction is issued through the operating unit 14 after setting of printing conditions has been completed as described above, the control unit 13 reads out image data from the image memory 17 and transfers the image data to the printer 12 through the I/F 20.

Upon receipt of gradation correction table data, hue correction table data, saturation correction table data and brightness correction table data, the control unit 22 of the printer 12 stores them into the RAMs 27, 28, 29 and 30, respectively.

Thereafter, when image data is transferred thereto, the control unit 22 captures the image data and temporarily stores it in the image memory 23. Thereafter, the image data is read out from the image memory 23 under the control of the control unit 22 and subjected to various corrections in the correcting unit 24. That is, gradation correction is made on the basis of the gradation correction table data written in the RAM 27, hue correction is made on the basis of the hue correction table data written in the RAM 28, saturation correction is made on the basis of the saturation correction table data written in the RAM 29, and brightness correction is made on the basis of the brightness correction table data written in the RAM 30.

R, G and B image data subjected to each correction as described above is converted into Y, M and C image data in the color signal converting unit 25 and output as a hard copy from the printing unit 26. The hard copy output in this way is a favorable hard copy in all respects, i.e. brightness, gradation, hue and saturation, as a matter of course.

In the foregoing, description has been made with regard to a case where a memory card which is stored with image data obtained by an electronic camera as an image input device is used. Next, description will be made with regard to a case where a video camera, a scanner, or a PC is used as an image input device.

The whole system configuration in this case comprises the image processor 10, shown in FIG. 1, and either a video camera or a scanner or a PC, which is connected to the image processor 10. The table memory 19 of the image processor 10 is stored with correction table data corresponding to each of combinations of various video cameras and various printers, and correction table data corresponding to each of combinations of various scanners and various printers. When a PC is used as an image input device, correction table data should be prepared in correspondence to each of combinations of not various types of PC but image processing software programs and printers, and stored in the table memory 19.

In a case where image data output from a video camera, a scanner or a PC is in compressed form, the image data is stored in the image memory 17 after being expanded in the expanding unit 16; in a case where the image data is not compressed, captured image data is stored in the image memory 17 as it is.

In a case where the video camera, scanner or PC is adapted to output image information such as that shown in FIG. 2, it is possible to adopt a menu such as that shown in FIG. 5 in the same way as in the above-described example. The reason for this is as follows: In such a case, the control unit 13 of the image processor 10 can identify the type of video camera, the type of scanner, or the name of image processing software, and it is therefore possible to recognize and identify a combination of a video camera and a printer, or a combination of a scanner and a printer, or a combination of an image processing software program and a printer.

Figure 7:
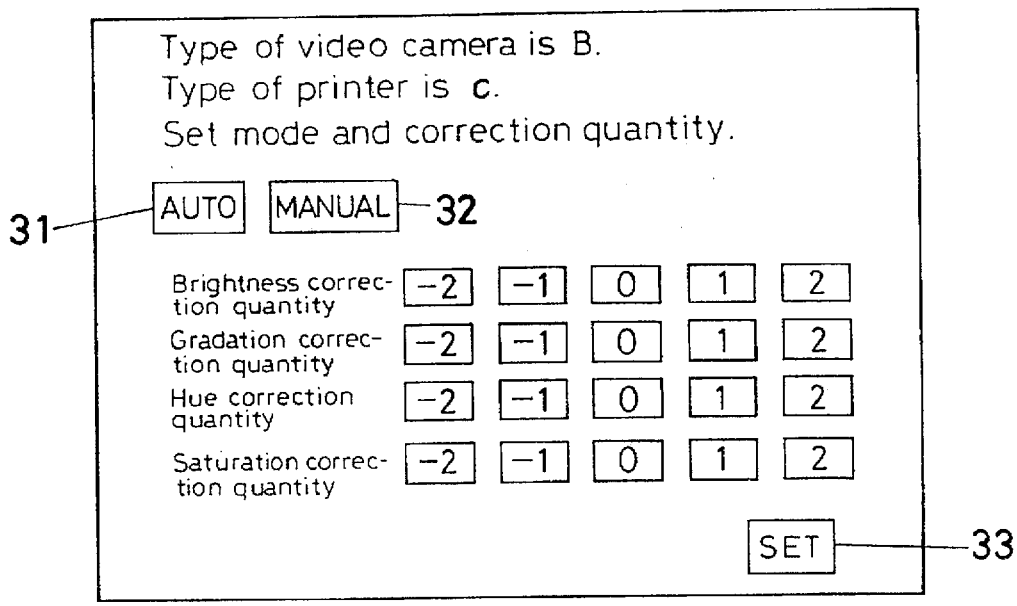
FIG. 7 shows an example of a menu.

However, in a case where the video camera, scanner or PC is adapted to output not image information such as that shown in FIG. 2 but merely image data, the type of video camera or scanner or the name of image processing software is first selected from a menu such as that shown for example in FIG. 6, and then each of correction quantities for brightness, gradation, hue and saturation is set by using a menu such as that shown for example in FIG. 7. It should be noted that FIG. 7 shows a menu used when a combination of a video camera of the type B and a printer of the type c has been selected from the menu shown in FIG. 6.

Figure 8:
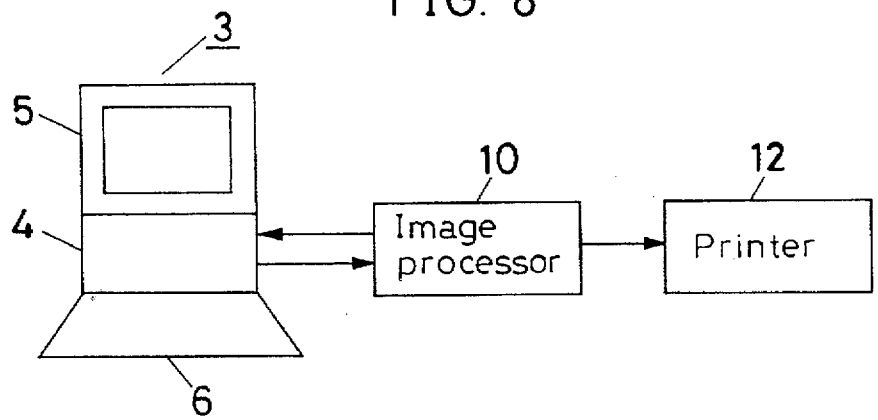
FIG. 8 shows an example of the arrangement of a printer system that uses an image processor, a PC, and a printer.
Figure 9:
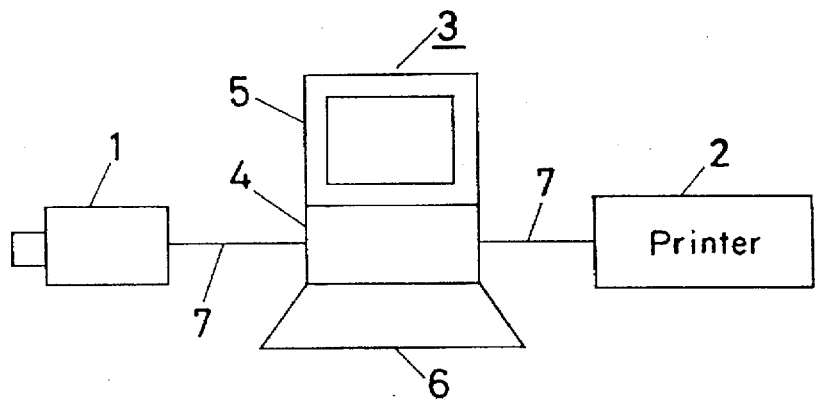
FIG. 9 shows an example of the arrangement of a conventional printer system.
Figure 10:
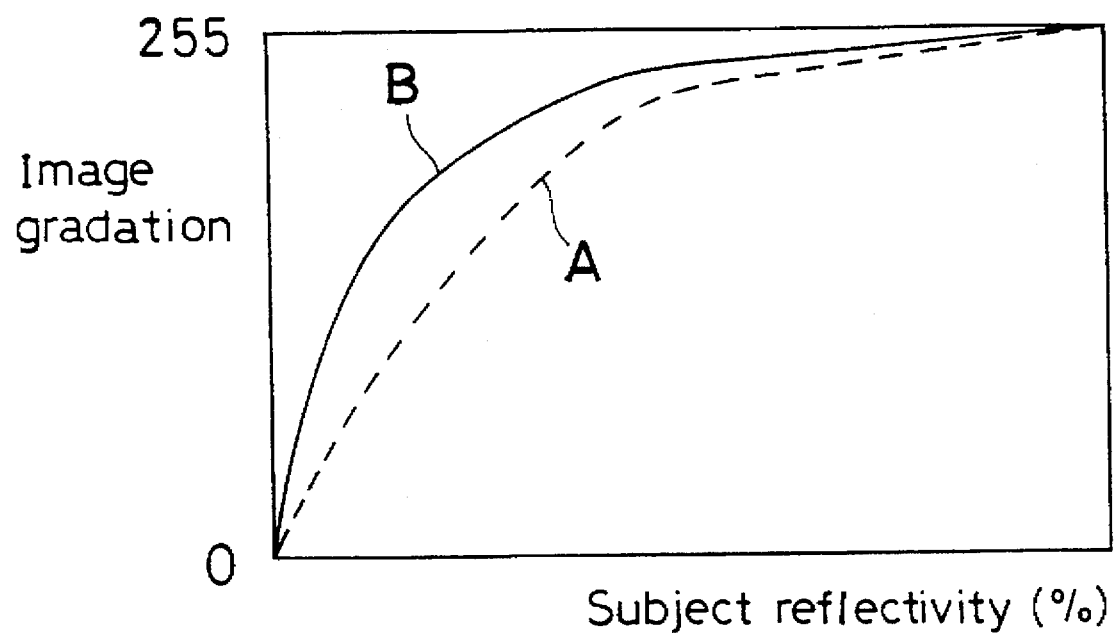
FIG. 10 is a graph for explaining problems associated with the conventional technique.

Here, an example of the arrangement of a printer system that uses an image processor 10, a PC 3, and a printer 12 is shown in FIG. 8 because it is deemed that such a printer system is particularly widely used.

In FIG. 8, the image processor 10 and the PC 3 are connected so that image data is transferred from an output terminal for monitor of the I/F 20 of the image processor 10 to the PC 3, and image data from the PC 3 is captured through the image data input unit 50.

Thus, image data captured from a memory card can be displayed on the monitor 5 of the PC 3, and it is also possible to subject the image data to various editing processing by image processing software, which has been activated in the PC 3, and to transfer the processed image data to the printer 12 through the image processor 10, thereby effecting printing.

In the arrangement shown in FIG. 8, if image data captured from a memory card in the image processor 10 transferred directly to the printer 12 to effect printing, the above-described operation is carried out, as a matter of course.

In a case where image data subjected to editing processing in the PC 3 or image data prepared by image processing software is to be printed, if the image processing software is adapted to output image information such as that shown in FIG. 2, it is possible to adopt a menu such as that shown in FIG. 5 in the same way as in the foregoing example. However, if the software is adapted to output not image information such as that shown in FIG. 2 but merely image data, the name of the image processing software is first selected from a menu such as that shown in FIG. 6, and then each of correction quantities for brightness, gradation, hue and saturation is set by using a menu such as that shown in FIG. 7.

Although the present invention has been described above by way of embodiments, it will be apparent to those skilled in the art that the present invention is not necessarily limited to the above-described embodiments, and that various changes and modifications may be imparted thereto.

For example, although in the above-described embodiments the control unit 13 of the image processor 10 recognizes the type of printer from attached information captured from the printer 12, the system may be arranged such that the user inputs the type of printer by using a menu similar to that shown in FIG. 6.

What is claimed is:

1. An image processor designed to print images of constant quality whatever type of image input device and whatever type of printer are combined with each other, said image processor comprising:

storage means for storing a plurality of items of at least one of correction table data necessary when an image is to be printed, such as gradation correction table data, saturation correction table data, hue correction table data, and brightness correction table data, for each combination of a type of image input device and a type of printer;

an image memory for storing image data read out from an image file recorded on a recording medium such as a memory card by an image input device such that compressed image data is stored after being expanded, whereas non-compressed image data is stored as it is; and control means for automatically or manually reading out correction table data from said storage means on the basis of information concerning an image input device written in an input image file and attached information such as information concerning a type of printer, and for transferring the correction table data to a printer, said control means further reading out image data from said memory and transferring it to the printer.

2. The image processor according to claim 1, further comprising a display unit displaying at least one of a type of printer to be used, a type of image input device to be used, images to be selected, and correction table data.

3. The image processor according to claim 1, wherein said control means further reads out correction table data in accordance with an exposure level of the image file.

4. The image processor according to claim 3, wherein said plurality of items stored in said storage means are not all read out at the same exposure level by said control means.

5. A printer for effecting printing on the basis of transferred image data, said printer comprising:

storage means for storing at least one of correction table data necessary when an image is to be printed, such as gradation correction table data, saturation correction table data, hue correction table data, and brightness correction table data;

an image memory for storing transferred image data; and control means for writing correction table data regarding an external source into said storage means and for correcting the image data stored in said image memory in accordance with specific correction table data stored in said storage means, said specific correction table data stored in said storage means being in accordance with gradation data of the external source and of the printer, thereby printing the corrected image data.

6. The printer according to claim 5, wherein the external source is a specific image input device.

7. A printer system comprising:

an image input device;

an image processor; and a printer for effecting printing on the basis of transferred image data and correction table data;

said image processor being designed to print images of constant quality whatever type of image input device and whatever type of printer are combined with each other, said image processor including:

storage means for storing a plurality of items of at least one of correction table data necessary when an image is to be printed, such as gradation correction table data, saturation correction table data, hue correction table data, and brightness correction table data, for each combination of a type of image input device and a type of printer;

an image memory for storing image data read out from an image file recorded on a recording medium such as a memory card by an image input device such that compressed image data is stored after being expanded, whereas non-compressed image data is stored as it is; and control means for automatically or manually reading out correction table data from said storage means on the basis of information concerning an image input device written in an input image file and attached information such as information concerning a type of printer, and for transferring the correction table data to a printer, said control means further reading out image data from said memory and transferring it to the printer;

said printer being arranged to effect printing on the basis of transferred image data, said printer including:

storage means for storing at least one of correction table data necessary when an image is to be printed, such as gradation correction table data, saturation correction table data, hue correction table data, and brightness correction table data;

an image memory for storing transferred image data; and control means for writing transferred correction table data into said storage means and for correcting the image data stored in said image memory by the correction table data stored in said storage means, thereby printing the corrected image data.

8. The printer system according to claim 7, wherein said image processor further includes a display unit displaying at least one of a type of printer to be used, a type of image input device to be used, images to be selected, and correction table data.

9. The printer system according to claim 7, wherein said control means further reads out correction table data in accordance with an exposure level of the image file.

10. The printer system according to claim 9, wherein said plurality of items stored in said storage means are not all read out at the same exposure level by said control means.

11. A method for printing images of constant quality whatever type of image input device and whatever type of printer are combined with each other, the method comprising the steps of:

first storing a plurality of items of at least one of correction table data necessary when an image is to be printed, such as gradation correction table data, saturation correction table data, hue correction table data, and brightness correction table data, for each combination of a type of image input device and a type of printer;

second storing image data read out from an image file recorded on a recording medium such as a memory card by an image input device such that compressed image data is stored after being expanded, whereas non-compressed image data is stored as it is; and automatically or manually reading out correction table data from said first storing step on the basis of information concerning an image input device written in an input image file and attached information such as information concerning a type of printer, transferring the correction table data to a printer, reading out image data from said second storing step and transferring it to the printer.

12. The method according to claim 11, further comprising displaying at least one of a type of printer to be used, a type of image input device to be used, images to be selected, and correction table data.

13. The method according to claim 11, wherein said reading out is in accordance with an exposure level of the image file.

14. The image processor according to claim 13, wherein said plurality of items stored by the first storing step are not all read out at the same exposure level by the reading out step.

15. A method for printing on a printer on the basis of transferred image data comprising the steps of:

storing, in a memory, at least one of correction table data necessary when an image is to be printed, such as gradation correction table data, saturation correction table data, hue correction table data, and brightness correction table data;

storing transferred image data;

writing correction table data regarding an external source into the memory, specific correction table data stored in the memory being in accordance with gradation data from both the external source and the printer;

correcting the image data stored by said storing step in accordance with the correction table data stored in the memory; and printing the corrected image data.

16. The method according to claim 15, wherein the external source is a specific image input device system.

* * * * *